United States Patent

Takatori et al.

[11] Patent Number: 6,086,501
[45] Date of Patent: Jul. 11, 2000

[54] HYDRO-MECHANICAL TRANSMISSION

[75] Inventors: Osamu Takatori; Eiichi Fukuda, both of Komatsu, Japan

[73] Assignee: Komatsu Ltd., Tokyo, Japan

[21] Appl. No.: 08/973,233

[22] PCT Filed: Jun. 7, 1996

[86] PCT No.: PCT/JP96/01549

§ 371 Date: Dec. 3, 1997

§ 102(e) Date: Dec. 3, 1997

[87] PCT Pub. No.: WO96/41977

PCT Pub. Date: Dec. 27, 1996

[30] Foreign Application Priority Data

Jun. 9, 1995 [JP] Japan ................................. 7-168014

[51] Int. Cl.[7] ............................................. F16H 47/04
[52] U.S. Cl. ............................. 475/72; 475/80; 475/81
[58] Field of Search .......................... 475/72, 74, 78, 475/80, 81; 477/62, 52

[56] References Cited

U.S. PATENT DOCUMENTS

| | | | |
|---|---|---|---|
| 3,728,910 | 4/1973 | Piret | 475/71 |
| 3,979,972 | 9/1976 | Sakai et al. | 475/81 |
| 5,228,355 | 7/1993 | Smith et al. | 74/467 |
| 5,667,452 | 9/1997 | Coutant | 475/72 |
| 5,695,422 | 12/1997 | Otten | 475/72 |

FOREIGN PATENT DOCUMENTS

| | | |
|---|---|---|
| 50-022167 | 3/1975 | Japan . |
| 50-076470 | 6/1975 | Japan . |
| 53-095462 | 8/1978 | Japan . |
| 61-059060 | 3/1986 | Japan . |
| 63-167172 | 7/1988 | Japan . |
| 64-011470 | 1/1989 | Japan . |
| 4-203653 | 7/1992 | Japan . |
| 5-044815 | 2/1993 | Japan . |
| 5-044816 | 2/1993 | Japan . |
| 5-060202 | 3/1993 | Japan . |
| 6-159474 | 6/1994 | Japan . |
| 1593750 | 7/1981 | United Kingdom . |

Primary Examiner—Charles A Marmor
Assistant Examiner—Tisha D. Waddell
Attorney, Agent, or Firm—Sidley & Austin

[57] ABSTRACT

A hydro-mechanical transmission (2) with a simple construction and which can make full use of its advantages is provided. In a hydro-mechanical transmission in which a hydraulic power transmitting mechanism (10), having a hydraulic pump and a hydraulic motor, and a mechanical power transmitting mechanism (20), using gears, are switchably provided; the speed of input rotation is changed, and the resultant rotation is generated; the mechanical power transmitting mechanism has at least one planetary gear mechanism, and an output shaft (24) of the mechanical power transmitting mechanism is provided so that its output can be generated directly to the outside. The hydraulic pump (11) and the hydraulic motor (12) of the hydraulic power transmitting mechanism are of a variable displacement type. A directly-coupled clutch (30) is interposed between a motor output shaft (14) of the hydraulic power transmitting mechanism and the output shaft of the mechanical power transmitting mechanism.

17 Claims, 2 Drawing Sheets

HYDRO-MECHANICAL TRANSMISSION

TECHNICAL FIELD

The present invention relates to a hydro-mechanical transmission which can be preferably used as a transmission of a wheeled hydraulic excavator or the like.

BACKGROUND ART

Transmissions of the mechanical type, the hydraulic type (so-called HST), the hydro-mechanical type, the belt type, and the like are generally known. Further, the types are classified, respectively. For example, the mechanical type is classified into the sliding-mesh type, the constant-mesh type, the synchromesh type, the planetary gear type, and the like.

Among the various transmissions, the hydro-mechanical transmission has a hydraulic power transmitting mechanism operated by a hydraulic pump and a hydraulic motor and a mechanical power transmitting mechanism using gears, which are switchably used. The speed of input rotation is changed and resultant rotation can be generated. Hydro-mechanical transmissions, as shown below, are recently known, in which the hydraulic power transmitting mechanism, by which a high torque can be obtained, is used at the time of low-speed output and the mechanical power transmitting mechanism, by which high transmission efficiency can be obtained, is used at the time of high-speed output.

(1) According to a hydro-mechanical transmission disclosed in Japanese Patent Application Laid-Open No. 5-44815 (a prior proposal by the applicant of the present invention), two planetary gear mechanisms are commonly used by a mechanical power transmitting mechanism and a hydraulic power transmitting mechanism and four directly-coupled clutches are used, thereby enabling each of forward and reverse hydraulic travel at the 1st to 3rd speeds and enabling each of the forward and reverse mechanical travel at the 1st to 3rd speeds to be switched.

(2) According to a hydro-mechanical transmission disclosed in Japanese Patent Application Laid-Open No. 6-159474, four counter-shaft clutches are commonly used by the mechanical and hydraulic power transmitting mechanisms and two directly-coupled clutches are used; so that reverse hydraulic travel at the 1st speed, in the event of deadheading a vehicle; forward starting hydraulic travel and forward mechanical travel at the 1st to 4th speeds; and forward hydraulic travel at the 1st to 4th speeds, in the event of travel for work, can be switched.

A mobile vehicle having a hydraulically driven working machine, for example, a wheeled hydraulic excavator, has a large number of opportunities to fully drive the working machine while the vehicle drives at low speed. It is also desirable that it move at high speed on highways. When the hydro-mechanical transmission is mounted on such a mobile vehicle, the forward/reverse travel can be efficiently switched by using the hydraulic power transmitting mechanism at the time of low speed travel. What is more, the hydraulic power transmitting mechanism has a variable displacement hydraulic pump and motor like the HST. There are also advantages that the vehicle can start with a high torque, perform the non-stage transmission, and distribute a large hydraulic power for the working machine irrespective of the driving speed. On the other hand, when the vehicle drives at high speed, there is also an advantage that the travel with high transmission efficiency can be realized by using the mechanical power transmitting mechanism.

With respect to the conventional hydro-mechanical transmissions, however, whether the hydraulic pump and the hydraulic motor of the hydraulic power transmitting mechanism are of a variable displacement type or not is not written. When it is assumed that the hydraulic pump and motor are of the variable displacement type, since the speed can be changed in a non-stage manner, the purpose of the description of the examples that "gears are shifted at a multi-stage by two planetary gear apparatus and four counter-shaft clutches" is unclear. In the examples, although a number of directly-coupled clutches are used so that the hydraulic travel in which the speed is changed at the multi-stage and the mechanical travel in which the speed is changed at the multi-stage can be switched, this makes the construction complicated. It cannot be said that the conventional techniques use most of the above-mentioned advantages of the hydro-mechanical transmission.

SUMMARY OF INVENTION

In consideration of the problems of the conventional techniques, it is an object of the invention to provide a hydro-mechanical transmission which can use most of its advantages with a simple construction.

According to the invention, there is provided a hydro-mechanical transmission in which a hydraulic power transmitting mechanism, having a hydraulic pump and a hydraulic motor, and a mechanical power transmitting mechanism, using gears, are switchably used; the speed of input rotation is changed; and the resultant rotation is generated; wherein the mechanical power transmitting mechanism has at least one planetary gear mechanism; an output shaft of the mechanical power transmitting mechanism is provided in such a manner that its output can be directly generated to the outside; the hydraulic pump and the hydraulic motor of the hydraulic power transmitting mechanism are of a variable displacement type; and a directly-coupled clutch is interposed between a motor output shaft of the hydraulic power transmitting mechanism and the output shaft of the mechanical power transmitting mechanism.

The directly-coupled clutch is arranged in a position which is higher than the level of a lubricating oil in a transmission case having therein the directly-coupled clutch.

More specifically, in a hydro-mechanical transmission in which a hydraulic power transmitting mechanism, having a hydraulic pump and a hydraulic motor, and a mechanical power transmitting mechanism, using gears, are switchably used; the speed of input rotation is changed; and the resultant rotation is generated; the mechanical power transmitting mechanism has first and second planetary gear mechanisms; an output shaft of the mechanical power transmitting mechanism is so provided as to generate an output directly to the outside; the hydraulic pump and the hydraulic motor of the hydraulic power transmitting mechanism are of a variable displacement type; one rotation clutch is interposed between an output shaft of the hydraulic power transmitting mechanism and the output shaft of the mechanical power transmitting mechanism; and the rotation clutch is arranged in a position which is higher than the level of a lubricating oil in a transmission case having therein the rotation clutch.

According to the construction, by using the planetary gear mechanism in the mechanical power transmitting mechanism, a large reduction ratio at the first speed or at the multi-speed can be obtained in a small space. Since the hydraulic pump and the hydraulic motor of the variable displacement type are used in the hydraulic power transmitting mechanism, the speed can be changed by only the mechanism itself. Only one directly-coupled clutch (rotation clutch) is used and connected, thereby switching an output of the mechanical power transmitting mechanism to an output of the hydraulic power transmitting mechanism, and the output is generated to the outside. As a result of the coupling, when the directly-coupled clutch is connected and the output rotation of the hydraulic power transmission is used as an output to the outside, a desired power can be supplied to another actuator having the same driving source irrespective of the rotational speed.

Since the hydraulic power transmitting mechanism itself can change the speed continuously variably, it is unnecessary to provide a plurality of planetary gear devices or counter-shaft clutches to be commonly used by the hydraulic and mechanical power transmitting mechanisms, and it is unnecessary to shift the speed at the multistage in both of the hydraulic travel and the mechanical travel as in the conventional technique. The speed at multistage can be changed by only the mechanical power transmitting mechanism, irrespective of the hydraulic power transmitting mechanism. Consequently, the plurality of directly-coupled clutches, required in the conventional technique to change the speed of the hydraulic and mechanical travel at multistage, are not needed. Only one directly-coupled clutch is therefore used. Thus, the size of the construction is reduced, and moreover, most of the advantages of the hydro-mechanical transmission can be used.

Further, as the directly-coupled clutch is provided in a position which is higher than the level of the lubricating oil, the lubricating oil is not agitated by the directly-coupled clutch. Consequently, inconveniences such as deterioration in the power transmission efficiency, bubbling of the lubricating oil, and the like are eliminated.

The effects of the hydro-mechanical transmission of the invention will be summarized as follows.

(1) Forward and reverse outputs (forward and reverse travel in case of a vehicle) can be efficiently switched by the hydraulic power transmitting mechanism.

(2) When the discharge of the pump is increased and the displacement of the motor is contrarily decreased, the hydro-mechanical transmission itself can generate a rotation at a crawling speed while fully operating the drive system other than the hydro-mechanical transmission.

(3) When the discharge of the pump is decreased and the displacement of the motor is contrarily increased, a rotation at a crawling speed can be generated with a high torque. When there is a drive system in addition to the hydro-mechanical transmission, for example, a flow control valve is additionally provided in a hydraulic circuit. When the flow rate to the motor is restricted by the flow control valve in a state where the discharge of the pump is increased and the displacement of the motor is also increased, most of the flow rate from the pump can be sent to the drive system other than the hydro-mechanical transmission to fully operate the drive system. Meanwhile, the hydro-mechanical transmission itself can output a rotation at a crawling speed with a high torque.

(4) Since the hydraulic output and the mechanical output can be switched by only one directly-coupled clutch, a compact hydro-mechanical transmission can be realized.

BEST MODE FOR CARRYING OUT THE INVENTION

A hydro-mechanical transmission according to an embodiment of the invention will be described in detail with reference to FIGS. 1 and 2.

Figure 1:
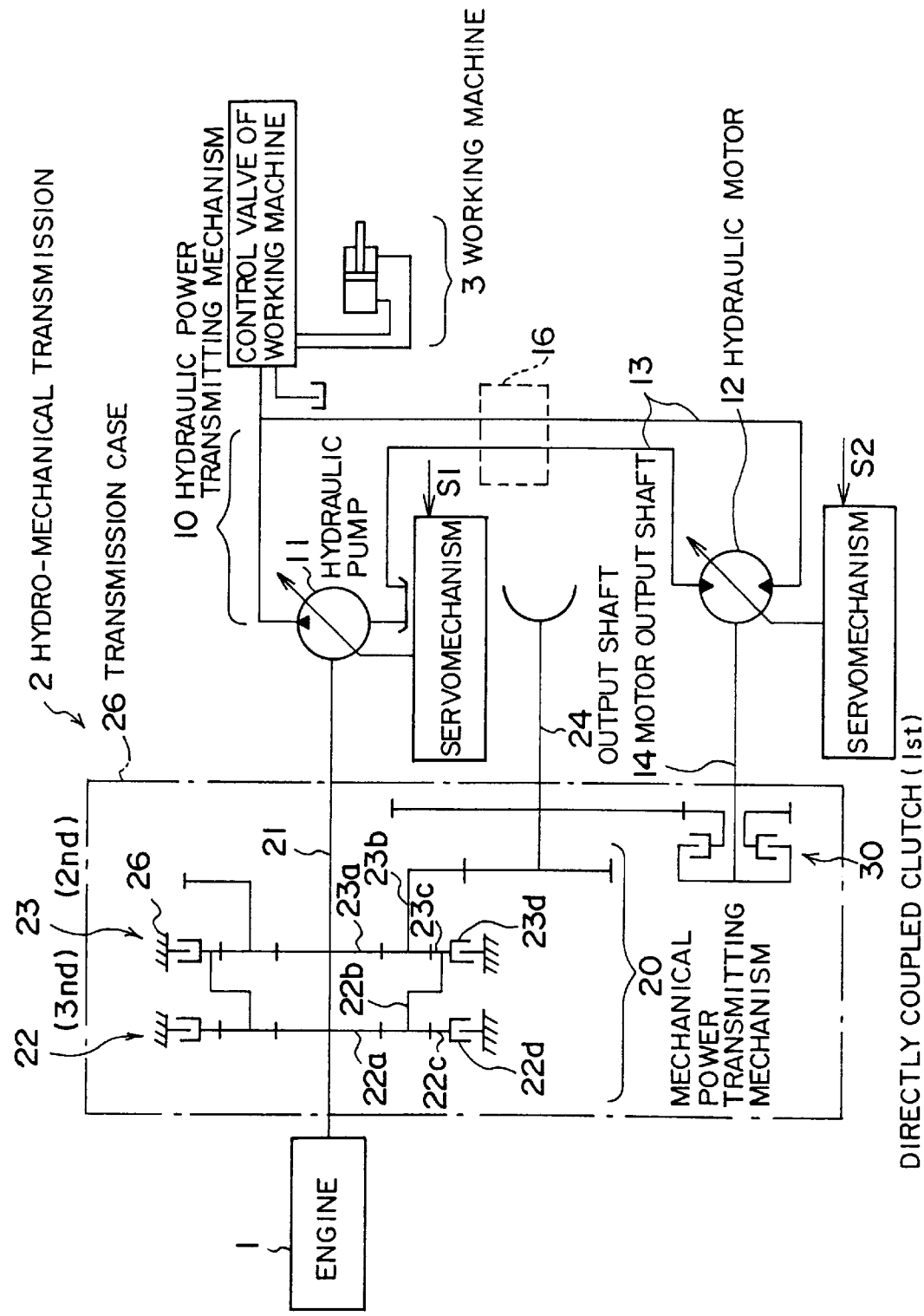
FIG. 1 is a diagram taken along line I—I of FIG. 2, illustrating the gear skeleton of a hydro-mechanical transmission according to an embodiment of the invention.

In FIG. 1, a hydro-mechanical transmission 2 is mounted on a wheeled hydraulic excavator (hereinbelow, called a hydraulic excavator) which is not shown. Necessary amounts of power of an engine 1, driving the hydraulic excavator, are distributed to the hydro-mechanical transmission 2 and a working machine 3, respectively.

The hydro-mechanical transmission 2 has a hydraulic power transmitting mechanism 10, a mechanical power transmitting mechanism 20, and a directly coupled clutch 30. The mechanical power transmitting mechanism 20, the directly coupled clutch 30, and a part of the hydraulic power transmitting mechanism 10 are housed in a transmission case 26. The details are as follows.

The hydraulic power transmitting mechanism 10 is constructed by a variable displacement hydraulic pump 11 (hereinbelow, called a pump 11), a variable displacement hydraulic motor 12 (hereinbelow, called a motor 12), and an oil path 13. In the pump 11, an instruction S1, controlled by a microcomputer, by an instruction of the operator, or by a working state of the working machine 3, is received by a servo mechanism; and the displacement is varied so that a necessary proper quantity of oil according to the instruction S1 is discharged. In the motor 12, an instruction S2 from the operator, the microcomputer, etc., is received by a servo mechanism and the displacement is varied so as to obtain a necessary proper torque according to the instruction S2. The pump 11 and the motor 12 are installed on a face opposite to the face on which the engine 1 is mounted to the transmission case 26, thereby reducing the size of the hydro-mechanical transmission 2.

The mechanical power transmitting mechanism 20 receives the rotational force from the engine 1 at one end and has a main shaft 21 for driving the pump 11 at the other end. Sun gears 22a and 23a, of the first and second planetary gear mechanisms 22 and 23, are fixed to the main shaft 21. A planet carrier 22b, of the first planetary gear mechanism 22, and a ring gear 23c, of the second planetary gear mechanism 23, are integrally coupled; and a planet carrier 23b, of the second planetary gear mechanism 23, is connected to an output shaft 24. The output shaft 24 is connected to a drive shaft (not shown) and transmits the output rotation via a differential gear, a final reduction gear, and the like to wheels, thereby allowing the hydraulic excavator to travel.

The rotational speed of the output shaft 24, obtained by idling the ring gear 22c of the first planetary gear mechanism 22 and fixing the ring gear 23c of the second planetary gear mechanism 23 to the transmission case 26, is consequently lower than the rotational speed of the output shaft 24 obtained by fixing the ring gear 22c of the first planetary gear mechanism 22 to the transmission case 26 and idling the ring gear 23c of the second planetary gear mechanism 23.

In the embodiment, hydraulic fluid is sent from a hydraulic circuit (not shown) to a clutch 23d, the ring gear 23c is fixed to the transmission case 26, the hydraulic fluid from a clutch 22d is drained, and the ring gear 22c is idled, thereby achieving the low-speed rotation of the output shaft 24. On the contrary, the ring gear 22c is fixed to the transmission case 26 by sending the hydraulic fluid from the hydraulic circuit (not shown) to the clutch 22d and the ring gear 23c is idled by draining the hydraulic fluid of the clutch 23d, thereby achieving the high-speed rotation of the output shaft 24. The hydraulic fluid is supplied or drained to/from the clutches 22d and 23d by a gear shift lever at the operator's seat or an instruction from the microcomputer.

The output shaft 14, of the motor 12 of the hydraulic power transmitting mechanism 10, is provided with a rotation clutch 30 which intermittently transmits the rotation to the output shaft 24 of the mechanical power transmitting mechanism 20. On the basis of the instruction by the gear shift lever at the operator's seat, from the microcomputer, etc., when the hydraulic fluid in the clutches 22d and 23d of the first and second planetary gear mechanisms 22 and 23 are drained and the hydraulic fluid from the hydraulic circuit (not shown) operates the rotation clutch 30, the rotation inputs from the first and second planetary gear mechanisms 22 and 23 to the output shaft 24 are shut off and the rotation of the motor output shaft 14 is inputted instead. By freely switching the hydraulic power transmitting mechanism 10 and the mechanical power transmitting mechanism 20 by the rotation clutch 30, the changing of the speed is achieved. In this case, the rotation clutch 30 plays the roll of the directly coupled clutch. It is obviously understood that two-stage gear change is achieved by supplying and draining the hydraulic fluid to/from the clutches 22d and 23d also in the mechanical power transmitting mechanism 20.

The effects of the hydro-mechanical transmission 2 according to the embodiment are as follows. Since the pump 11 and the motor 12 of the hydro-mechanical transmitting mechanism 10 are of the variable displacement type, non-stage transmission can be performed. Consequently, the following can be achieved.

(1) Forward and reverse travel can be efficiently switched.

(2) When the discharge of the pump 11 is increased and the displacement of the motor 12 is contrarily decreased, travel at a crawling speed, while fully operating the working machine 3, can be realized.

(3) When the discharge of the pump 11 is decreased and the displacement of the motor 12 is contrarily increased, travel at a crawling speed with a high torque can be realized.

When there is a drive system in addition to the hydro-mechanical transmission 2, for example, a flow control valve 16 shown by a broken line in FIG. 1 is additionally provided in the hydraulic circuit. When the flow rate to the motor 12 is restricted by the flow control valve 16 in a state where the discharge of the pump 11 is increased and the displacement of the motor 12 is also increased, most of the flow rate from the pump 11 is sent to the drive system other than the hydro-mechanical transmission 2, and the hydro-mechanical transmission 2 itself can output a rotation at a crawling speed with a high torque while fully operating the drive system.

(4) The hydro-mechanical transmission 10 can be used for the forward drive at the first speed and the reverse drive, the lower speed rotation of the mechanical power transmitting mechanism 20 can be used for the second speed, and the higher speed rotation can be used for the third speed. On the other hand, by exclusively using the first and second planetary gear mechanisms 22 and 23 in the mechanical power transmitting mechanism 20, the hydraulic drive and the mechanical drive can be switched by one direct-coupled clutch 30. Consequently, the hydro-mechanical transmission 2 has an extremely simple structure. It is obviously understood that the number of the first and second planetary gear mechanisms 22 and 23 is not limited to two. One or three or more of them can be also used. In any case, it is sufficient to mount only one directly-coupled clutch 30.

Figure 2:
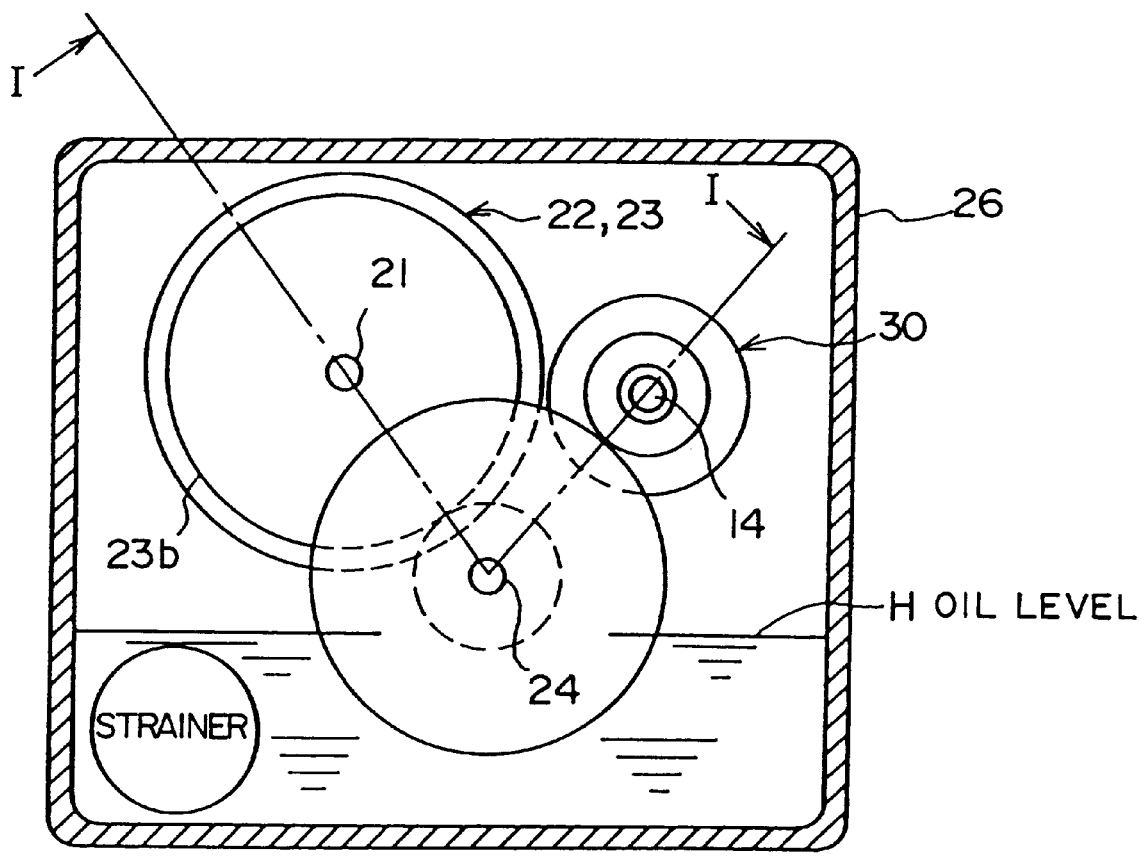
FIG. 2 is a vertical section of the hydro-mechanical transmission according to the embodiment of the invention.

As shown in FIG. 2, the directly-coupled clutch 30 is provided higher than the level H of the lubricating oil in the transmission case 26. Consequently, the directly-coupled clutch 30 does not agitate the lubricating oil at the time of rotation, so that inconveniences such as power transmission loss, splash and bubbling of the lubricating oil, and the like caused by agitating the lubricating oil can be checked. It is unnecessary to limit the directly-coupled clutch 30 to the rotation clutch as shown in the embodiment.

Although the pump 11 is commonly used by the working machine 3 and the motor 12 in the hydro-mechanical transmission 2, a pump exclusively used by the working machine 3 can be also provided. In this case as well, since there is only one engine 1 as a power source, effects similar to the above can be obtained.

INDUSTRIAL APPLICABILITY

The present invention is useful as a hydro-mechanical transmission which can make full use of its advantages with a simple construction and can be used for the wheeled hydraulic excavator and the like.

We claim:

1. A hydro-mechanical transmission comprising:

a hydraulic power transmitting mechanism, having a hydraulic pump, a hydraulic motor, and an output shaft;

the hydraulic pump of the hydraulic power transmitting mechanism being a variable displacement hydraulic pump;

the hydraulic motor of the hydraulic power transmitting mechanism being a variable displacement hydraulic motor;

a mechanical power transmitting mechanism, which has at least one planetary gear mechanism, and an output shaft; the output shaft of the mechanical power transmitting mechanism generating output outside of the hydro-mechanical transmission; and a single directly coupled clutch interposed between the output shaft of the hydraulic power transmitting mechanism and the output shaft of the mechanical power transmitting mechanism, the hydro-mechanical transmission being operable in a first mode having said clutch disengaged with the output shaft of the mechanical power transmitting mechanism being driven solely by the mechanical power transmitting mechanism and in an second mode having said clutch engaged with the output shaft of the mechanical power transmitting mechanism being driven solely by the hydraulic power transmitting mechanism.

2. A hydro-mechanical transmission in accordance with claim 1, wherein said single directly-coupled clutch is connected to the output shaft of said mechanical power transmitting mechanism by at least one gear, and wherein the output shaft of the mechanical power transmitting mechanism can be driven by said hydraulic motor via said single directly-coupled clutch.

3. A hydro-mechanical transmission in accordance with claim 1, wherein engagement of said single directly-coupled clutch transfers power from the output shaft of said hydraulic power transmitting mechanism to said output shaft of said mechanical power transmitting mechanism.

4. A hydro-mechanical transmission in accordance with claim 3, further comprising a transmission case having the directly-coupled clutch positioned therein, said directly-coupled clutch being arranged in said transmission case at a position which is above a level of lubricating oil in said transmission case.

5. A hydro-mechanical transmission in accordance with claim 4, wherein said single directly-coupled clutch is connected to the output shaft of said mechanical power transmitting mechanism by at least one gear; and wherein the output shaft of said mechanical power transmitting mechanism can be driven by said hydraulic motor via said single directly-coupled clutch.

6. A hydro-mechanical transmission in accordance with claim 1, further comprising a transmission case having the directly-coupled clutch positioned therein, said directly-coupled clutch being arranged in said transmission case at a position which is above a level of lubricating oil in said transmission case.

7. A hydro-mechanical transmission comprising:
   a hydraulic power transmitting mechanism, having a hydraulic pump, a hydraulic motor, and an output shaft; the hydraulic pump of the hydraulic power transmitting mechanism being a variable displacement hydraulic pump; the hydraulic motor of the hydraulic power transmitting mechanism being a variable displacement hydraulic motor;
   a mechanical power transmitting mechanism, which has an output shaft and at least a first planetary gear mechanism and a second planetary gear mechanism;
   the output shaft of a mechanical power transmitting mechanism generating output outside of the hydro-mechanical transmission; and
   a single rotation clutch interposed between the output shaft of the hydraulic power transmitting mechanism and the output shaft of the mechanical power transmitting mechanism;
   wherein said hydraulic power transmitting mechanism and said mechanical power transmitting mechanism can be switchably used by engaging and disengaging said single rotation clutch, the output shaft of the mechanical power transmitting mechanism being driven solely by the hydraulic power transmitting mechanism with said single rotation clutch engaged and said output shaft of the mechanical power transmitting mechanism being driven solely by the mechanical power transmitting mechanism when said single rotation clutch is disengaged.

8. A hydro-mechanical transmission in accordance with claim 7, wherein said first planetary gear mechanism comprises a sun gear, a planet carrier, and a ring gear; and wherein said second planetary gear mechanism comprises a sun gear, a planet carrier, and a ring gear.

9. A hydro-mechanical transmission in accordance with claim 7, wherein engagement of said single rotation clutch transfers power from the output shaft of said hydraulic power transmitting mechanism to said output shaft of said mechanical power transmitting mechanism.

10. A hydro-mechanical transmission in accordance with claim 9, further comprising a transmission case having the rotation clutch positioned therein, said rotation clutch being arranged in said transmission case at a position which is above a level of lubricating oil in said transmission case.

11. A hydro-mechanical transmission in accordance with claim 10, wherein said single rotation clutch is connected to the output shaft of said mechanical power transmitting mechanism by at least one gear; and wherein said output shaft of said mechanical power transmitting mechanism can be driven by said hydraulic motor.

12. A hydro-mechanical transmission in accordance with claim 7, further comprising a transmission case having the rotation clutch positioned therein, said rotation clutch being arranged in said transmission case at a position which is above a level of lubricating oil in said transmission case.

13. A hydro-mechanical transmission comprising:
   a hydraulic power transmitting mechanism, having a hydraulic pump, a hydraulic motor, and an output shaft; the hydraulic pump of the hydraulic power transmitting mechanism being a variable displacement hydraulic pump; the hydraulic motor of the hydraulic power transmitting mechanism being a variable displacement hydraulic motor;
   a mechanical power transmitting mechanism, which has an output shaft and at least a first planetary gear mechanism and a second planetary gear mechanism; the output shaft of the mechanical power transmitting mechanism generating output outside of the hydro-mechanical transmission;
   a single rotation clutch interposed between the output shaft of the hydraulic power transmitting mechanism and the output shaft of the mechanical power transmitting mechanism;
   wherein said hydraulic power transmitting mechanism and said mechanical power transmitting mechanism can be switchably used by engaging and disengaging said single rotation clutch; and
   a first clutch for selectively engaging the ring gear of said first planetary gear mechanism and a second clutch for selectively engaging the ring gear of said second planetary gear mechanism.

14. A hydro-mechanical transmission in accordance with claim 13, wherein each of said sun gears is connected to a main shaft which is adapted to be driven by an engine; wherein the planet carrier of said first planetary gear mechanism is connected to the ring gear of said second planetary gear mechanism; and wherein the ring gear of said second planetary gear mechanism is connected to the output shaft of the mechanical power transmitting mechanism.

15. A hydro-mechanical transmission in accordance with claim 14, wherein said main shaft is connected to said hydraulic pump.

16. A hydro-mechanical transmission in accordance with claim 15, further comprising a transmission case having the rotation clutch positioned therein, said rotation clutch being arranged in said transmission case at a position which is above a level of lubricating oil in said transmission case.

17. A hydro-mechanical transmission in accordance with claim 16, wherein said single rotation is connected to the output shaft of said mechanical power transmitting mechanism by at least one gear, and wherein said output shaft of the mechanical power transmitting mechanism can be driven by said hydraulic motor via said rotation clutch.

* * * * *

UNITED STATES PATENT AND TRADEMARK OFFICE
CERTIFICATE OF CORRECTION

PATENT NO. : 6,086,501
DATED : July 11, 2000
INVENTOR(S) : Osamu Takatori et al.

It is certified that error appears in the above-identified patent and that said Letters Patent is hereby corrected as shown below:

<u>Column 8,</u>
Line 53 (claim 17, line 2), after "rotation", insert -- clutch --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*